United States Patent
Lim (10) Patent No.: US 12,294,669 B2
(45) Date of Patent: May 6, 2025

(54) PROTECTIVE CAP AND DISPLAY DEVICE HAVING THE SAME

(71) Applicant: Samsung Display Co., Ltd., Yongin-Si (KR)

(72) Inventor: Heesung Lim, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 490 days.

(21) Appl. No.: 17/395,698

(22) Filed: Aug. 6, 2021

(65) Prior Publication Data

US 2022/0159111 A1    May 19, 2022

(30) Foreign Application Priority Data

Nov. 19, 2020 (KR) .......... 10-2020-0155765

(51) Int. Cl.
G06F 1/16      (2006.01)
H04B 1/3888   (2015.01)
H04M 1/02     (2006.01)

(52) U.S. Cl.
CPC ........ *H04M 1/0266* (2013.01); *G06F 1/1637* (2013.01); *G06F 1/1656* (2013.01); *H04B 1/3888* (2013.01)

(58) Field of Classification Search
CPC .... G06F 1/1601; G06F 1/1616; G06F 1/1626; G06F 1/1637; G06F 1/1643; G06F 1/1652; G06F 1/1656; H04M 1/0269; H04M 1/185; H04M 1/388; H04M 1/0266; H04M 1/0249; H04M 1/0277; H04B 1/3888; H05K 5/03; H05K 5/02; H05K 5/0214; H05K 5/0217; H05K 1/189; H05K 1/147; H05K 2201/056; G02F 1/133308; G02F 1/133311; G02F 1/133314; G02F 1/133317
See application file for complete search history.

(56) References Cited

U.S. PATENT DOCUMENTS

| | | | | |
|---|---|---|---|---|
| 6,657,620 B2* | 12/2003 | Oishi | ........... | H05K 7/20963 345/206 |
| 7,436,668 B2* | 10/2008 | Bae | ........... | G06F 1/1601 361/704 |
| 7,466,552 B2* | 12/2008 | Shin | ........... | H05K 7/20963 165/185 |
| 7,508,673 B2* | 3/2009 | Kim | ........... | H01J 11/10 313/46 |
| 7,656,666 B2* | 2/2010 | Jeong | ........... | H05K 7/20963 348/58 |

(Continued)

FOREIGN PATENT DOCUMENTS

| | | |
|---|---|---|
| JP | 2019-032502 A2 | 2/2019 |
| KR | 10-1087231 | 11/2011 |

(Continued)

*Primary Examiner* — Adrian S Wilson
*Assistant Examiner* — Gage Crum
(74) *Attorney, Agent, or Firm* — F. CHAU & ASSOCIATES, LLC (57) ABSTRACT

A protective cap includes: a base substrate including a base surface; a plurality of blocks disposed on the base surface; and a plurality of cover plates disposed at an edge of the base surface, wherein the base surface includes a first area and a second area, wherein the plurality of blocks are disposed in the first area and are not disposed in the second area.

19 Claims, 9 Drawing Sheets

(56) References Cited

U.S. PATENT DOCUMENTS

| | | | |
|---|---|---|---|
| 10,091,341 B1 | 10/2018 | Cha et al. | |
| 10,490,770 B2 | 11/2019 | Kim et al. | |
| 2005/0078446 A1* | 4/2005 | Bae | G06F 1/1601 |
| | | | 361/679.52 |
| 2005/0088093 A1* | 4/2005 | Kim | H05K 7/20963 |
| | | | 313/582 |
| 2005/0117285 A1* | 6/2005 | Bang | H05K 7/20963 |
| | | | 248/917 |
| 2006/0044745 A1* | 3/2006 | Kim | G06F 1/1601 |
| | | | 361/679.22 |
| 2006/0245167 A1* | 11/2006 | Jeong | H05K 5/02 |
| | | | 361/718 |
| 2006/0291153 A1* | 12/2006 | Bae | G06F 1/1601 |
| | | | 361/679.54 |
| 2008/0062628 A1* | 3/2008 | Bang | H05K 5/0217 |
| | | | 361/679.01 |
| 2009/0034180 A1* | 2/2009 | Lee | G06F 1/1601 |
| | | | 361/679.27 |
| 2010/0097299 A1* | 4/2010 | Kang | H05K 7/20963 |
| | | | 345/60 |
| 2010/0171684 A1* | 7/2010 | Park | H05K 5/02 |
| | | | 345/60 |
| 2015/0247626 A1* | 9/2015 | Kang | H05B 33/28 |
| | | | 362/418 |
| 2019/0380197 A1* | 12/2019 | Lee | H05K 1/028 |
| 2020/0057472 A1* | 2/2020 | Kang | G06F 1/1601 |
| 2020/0135063 A1* | 4/2020 | Kang | G06F 1/1652 |
| 2020/0196492 A1* | 6/2020 | Jung | H05K 1/189 |
| 2020/0260612 A1* | 8/2020 | Bang | H05K 5/0017 |

FOREIGN PATENT DOCUMENTS

| | | | | |
|---|---|---|---|---|
| KR | 10-2014-0035743 A | | 3/2014 | |
| KR | 20140035802 A | * | 3/2014 | ............ H01L 51/50 |
| KR | 10-1408384 | | 6/2014 | |
| KR | 10-2018-0029190 | | 3/2018 | |
| KR | 10-2020-0075578 A | | 6/2020 | |

* cited by examiner

PROTECTIVE CAP AND DISPLAY DEVICE HAVING THE SAME

CROSS-REFERENCE TO RELATED APPLICATION

This U.S. non-provisional patent application claims priority under 35 U.S.C. § 119 to Korean Patent Application No. 10-2020-0155765, filed on Nov. 19, 2020, the disclosure of which is incorporated by reference herein in its entirety.

TECHNICAL FIELD

The present invention relates to a protective cap and a display device having the same. More particularly, the present invention relates to a protective cap including blocks and plates and a display device having the protective cap.

DISCUSSION OF THE RELATED ART

Display devices, such as a smartphone, a tablet computer, a notebook computer, and a smart television, or the like, are currently under development. The display devices display images to provide information to a user. Generally, the display device may include a variety of display panels.

SUMMARY

According to an embodiment of the present invention, a protective cap includes: a base substrate including a base surface; a plurality of blocks disposed on the base surface; and a plurality of cover plates disposed at an edge of the base surface, wherein the base surface includes a first area and a second area, wherein the plurality of blocks are disposed in the first area and are not disposed in the second area.

In an embodiment of the present invention, the plurality of blocks are configured to attach to and to detach from the base surface, wherein the plurality of blocks are attached to the first area, and are not attached to the second area.

In an embodiment of the present invention, the first area is provided in plural, and the plurality of blocks disposed in a first-first area among the first areas include an adhesive member.

In an embodiment of the present invention, the edge of the base surface is provided in plural, and the cover plates are disposed at a first edge of the edges and are arranged in one direction.

In an embodiment of the present invention, the plurality of cover plates are configured to attach and to detach from the base surface.

In an embodiment of the present invention, each of the plurality of cover plates has a height greater than a height of each of the plurality of blocks, and the height is in a thickness direction of the base substrate.

In an embodiment of the present invention, the plurality of blocks have substantially a same size as each other.

In an embodiment of the present invention, the plurality of blocks are spaced apart from each other at a predetermined interval.

In an embodiment of the present invention, the first area is provided in plural, and each of the first areas includes a different number of blocks from each other.

According to an embodiment of the present invention, a display device includes: a display panel; a driving circuit unit connected to the display panel; and a protective cap attached to the display panel and covering the driving circuit unit. The protective cap includes: a base substrate including a base surface including a first area and a second area, wherein the first area overlaps the driving circuit unit, and the second area is adjacent to the first area; a plurality of blocks protruding from the base surface; and a plurality of cover plates attached to an edge of the base surface, wherein the plurality of blocks are disposed in the first area and are not disposed in the second area.

In an embodiment of the present invention, the plurality of blocks are configured to attach to and detach from the base surface, wherein the plurality of blocks are attached to the first area, and are not attached to the second area.

In an embodiment of the present invention, the first area includes a contact area and a support area, wherein the contact area overlaps the display panel, wherein the support area overlaps the driving circuit unit, and wherein an adhesive member is disposed between the plurality of blocks, which are disposed in the contact area, and the display panel.

In an embodiment of the present invention, the support area is provided in plural, and the support areas have different widths from each other and include different numbers of blocks from each other.

In an embodiment of the present invention, the plurality of cover plates are configured to attach to and detach from the base surface.

In an embodiment of the present invention, the display panel includes: a display portion displaying an image on an upper surface thereof; and a bending portion extending from the display portion and bent to face a rear surface of the display panel, and wherein the driving circuit unit is connected to the bending portion and is disposed on the rear surface of the display panel.

In an embodiment of the present invention, the base substrate of the protective cap covers the driving circuit unit, and the plurality of cover plates cover the bending portion.

In an embodiment of the present invention, the plurality of blocks have substantially a same size as each other.

In an embodiment of the present invention, each of the plurality blocks has a height smaller than a height of each of the plurality of cover plates, and the height is in a thickness direction of the base substrate.

In an embodiment of the present invention, the second area of the base surface is spaced apart from the driving circuit unit by a height of the plurality of blocks in a thickness direction of the base substrate.

In an embodiment of the present invention, the base substrate of the protective cap entirely covers the driving circuit unit in a thickness direction.

BRIEF DESCRIPTION OF THE DRAWINGS

The above and other aspects of the present invention will become more apparent by describing in detail embodiments thereof, with reference to the accompanying drawings, in which.

DETAILED DESCRIPTION OF THE EMBODIMENTS

In the present disclosure, it will be understood that when an element or layer is referred to as being "on", "connected to" or "coupled to" another element or layer, it can be directly on, connected or coupled to the other element or layer or intervening elements or layers may be present.

Like numerals refer to like elements throughout the specification and the drawings. In the drawings, the thickness, ratio, and dimension of components may be exaggerated for effective description of the technical content. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, in the example, terms "below" and "beneath" may encompass both an orientation of above, below and beneath. The device may be otherwise oriented (e.g., rotated 90 degrees or at other orientations) and the spatially relative descriptors used herein may be interpreted accordingly.

Hereinafter, the present invention will be explained in detail with reference to the accompanying drawings.

Figure 1:
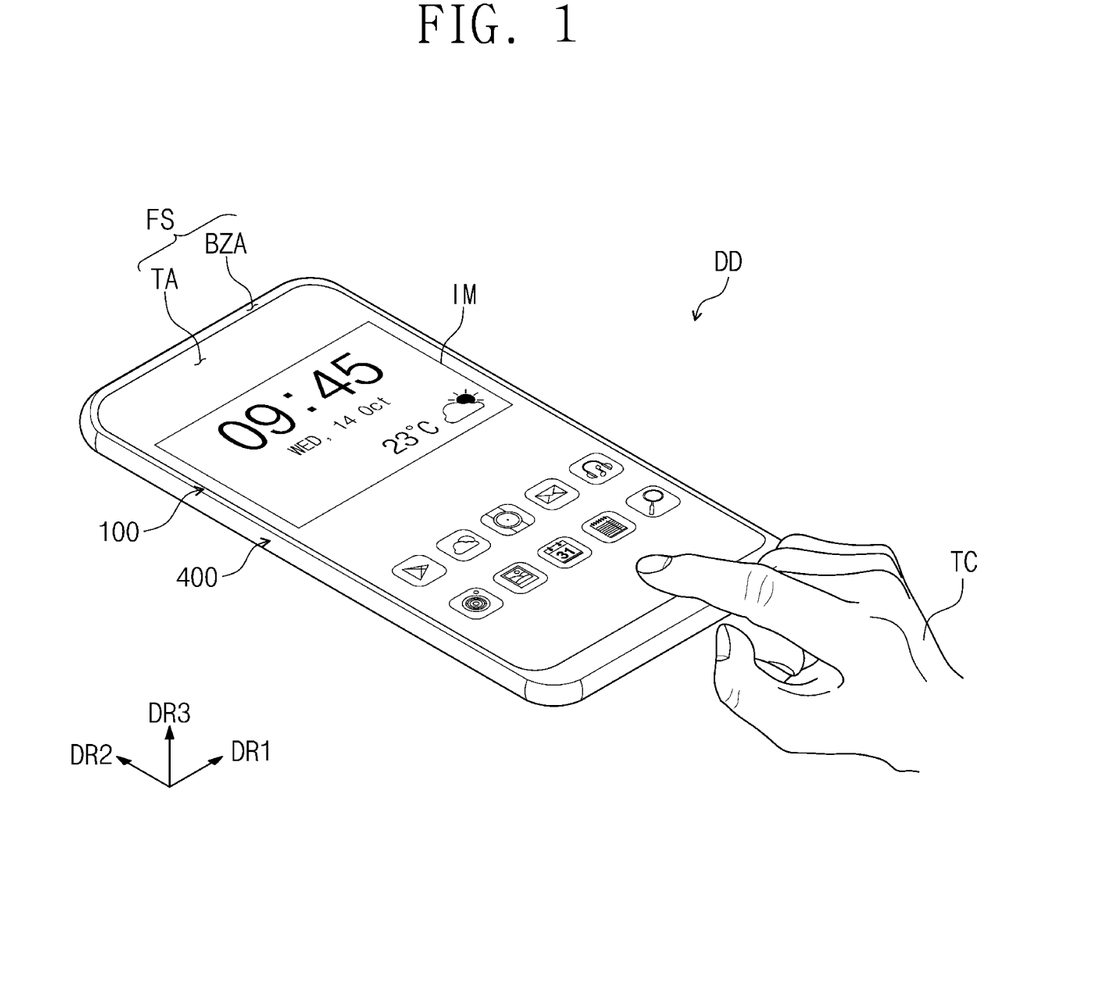
FIG. 1 is a perspective view illustrating a display device according to an embodiment of the present invention.
Figure 2:
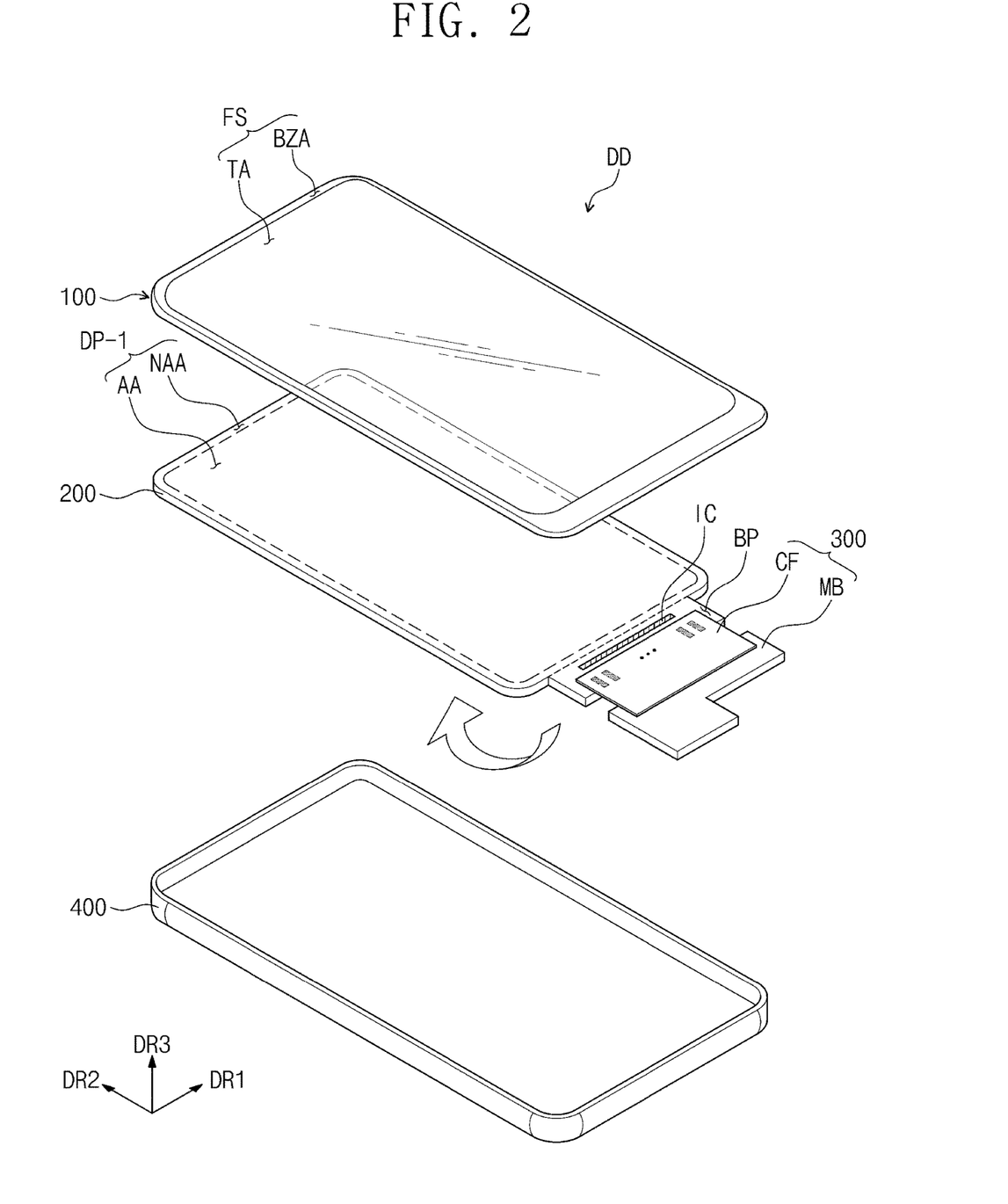
FIG. 2 is an exploded perspective view illustrating a display device according to an embodiment of the present invention.
Figure 3:
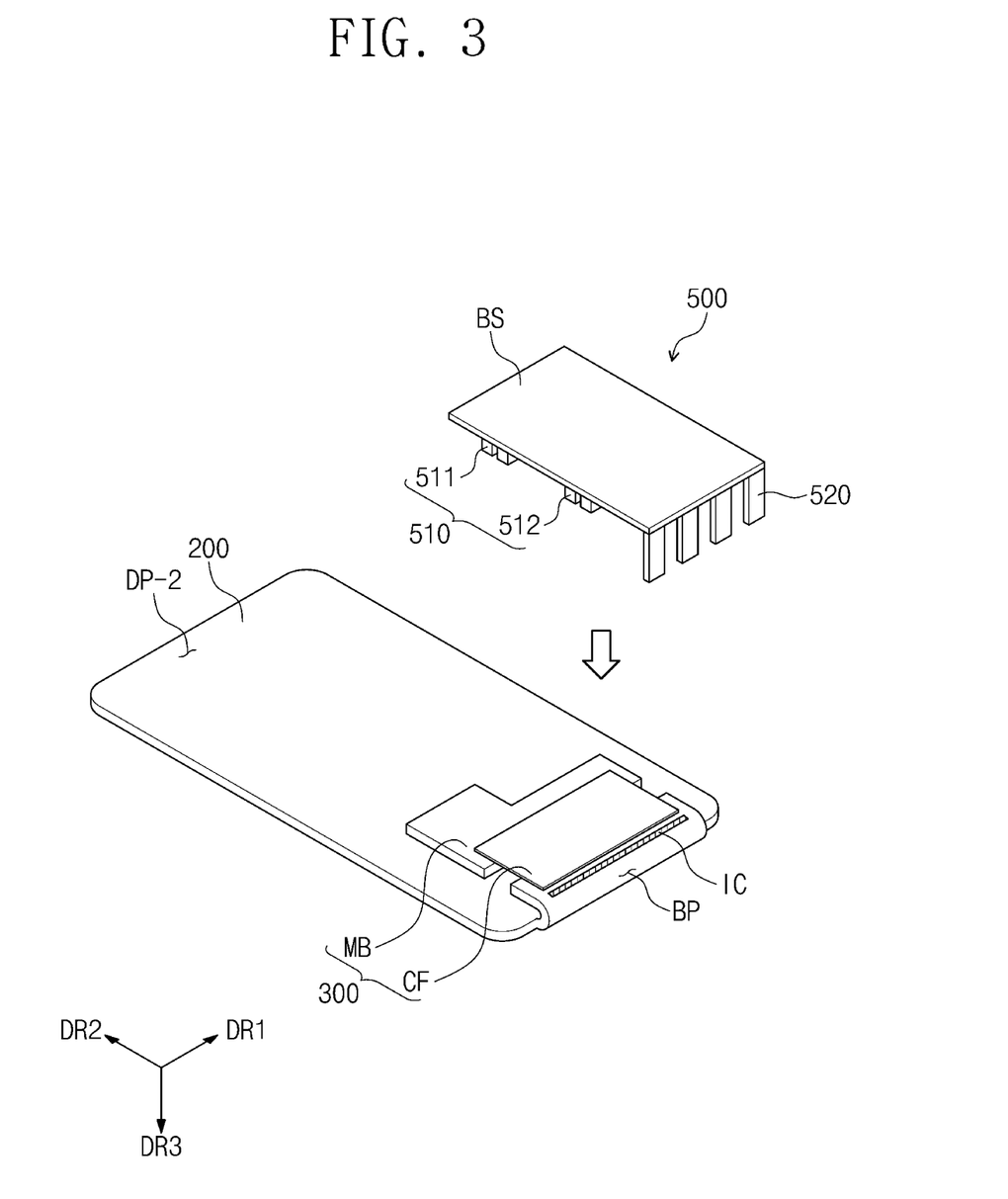
FIG. 3 is an exploded perspective view illustrating a display device according to an embodiment of the present invention.

FIG. 1 is a perspective view showing a display device DD according to an embodiment of the present invention, FIG. 2 is an exploded perspective view illustrating the display device DD according to an embodiment of the present invention, and FIG. 3 is an exploded perspective view showing the display device DD according to an embodiment of the present invention.

Referring to FIGS. 1 and 2, the display device DD may be activated in response to electrical signals. For example, the display device DD may be applied to a large-sized electronic item, such as a television set, a monitor, or an outdoor billboard, and a small to medium-sized electronic item, such as a personal computer, a notebook computer, a personal digital assistant, a car navigation unit, a portable gaming device, a mobile electronic device, and a camera. However, these are merely examples, and the display device DD may be applied to other display items as long as they do not depart from the spirit and scope of the present invention. In the present embodiment, a smartphone will be described as a representative example of the display device DD.

The display device DD may display an image IM in a third direction DR3 through a display surface FS that is substantially parallel to each of a first direction DR1 and a second direction DR2. The display surface FS through which the image IM is displayed may correspond to a front surface of the display device DD and a front surface of a window 100. Hereinafter, the display surface and the front surface of the display device DD and the front surface of the window 100 are assigned with the same reference numeral. The image IM may include a still image as well as a video. FIG. 1 shows a clock widget and application icons as a representative example of the image IM.

In the present embodiment, front (or upper) and rear (or lower) surfaces of each member may be defined with respect to a direction in which the image IM is displayed. The front and rear surfaces of components are opposite to each other in the third direction DR3, and a normal line direction of each of the front and rear surfaces may be substantially parallel to the third direction DR3. The third direction DR3 may cross the first direction DR1 and the second direction DR2. The first direction DR1, the second direction DR2, and the third direction DR3 may be substantially perpendicular to each other.

In the present invention, a surface defined by the first direction DR1 and the second direction DR2 may be referred to as a plane, and the expression "when viewed in a plane" may mean a state of being viewed in the third direction DR3.

The display device DD may include the window 100, a display panel 200, a driving circuit unit 300, a housing 400, and a protective cap 500 (refer to FIG. 3). In the present embodiment, the window 100 and the housing 400 may be coupled to each other to form an exterior of the display device DD.

The window 100 may include an optically transparent insulating material. For example, the window 100 may include glass or plastic. The window 100 may have a single-layer or multi-layer structure. For example, the window 100 may include a plurality of plastic films attached to each other by an adhesive or may include a glass substrate and a plastic film attached to the glass substrate by an adhesive.

The window 100 may be divided into a transmission area TA and a bezel area BZA in a plane. The transmission area TA may be an optically transparent area. For example, the bezel area BZA may have a light transmittance that is relatively lower than that of the transmission area TA. The bezel area BZA may form a shape of the transmission area TA. The bezel area BZA may be disposed adjacent to the transmission area TA and may at least partially surround the transmission area TA.

The bezel area BZA may have a predetermined color. The bezel area BZA may cover a peripheral area NAA of the display panel 200 to prevent the peripheral area NAA from being viewed from the outside. However, this is merely one example, and the bezel area BZA may be omitted from the window 100 according to an embodiment of the present invention.

The display panel 200 may be disposed under the window 100. The display panel 200 may display the image IM. The display panel 200 may include a display portion DP-1 including an active area AA and the peripheral area NAA in a front surface thereof. The active area AA may be activated in response to electrical signals.

In the present embodiment, the active area AA of the display portion DP-1 may be the area in which the image IM is displayed. The transmission area TA may overlap the active area AA. For example, the transmission area TA may overlap at least a portion or entire portion of the active area AA. Therefore, a user may view the image IM through the transmission area TA.

The peripheral area NAA may be covered by the bezel area BZA. For example, the bezel area BZA may completely cover the peripheral area NAA. The peripheral area NAA may be disposed adjacent to the active area AA. The peripheral area NAA may at least partially surround the active area AA. For example, the peripheral area NAA may completely surround the active area AA. A driving circuit and/or a driving line to drive the active area AA may be disposed in the peripheral area NAA. For example, the size of the bezel area BZA may be reduced in the front surface of the display device DD. In addition, the peripheral area NAA may be omitted from the display panel 200 according to an embodiment of the present invention.

In the present embodiment, the display panel 200 may have a substantially flat surface such that the display portion DP-1 including the active area AA and the peripheral area NAA face the window 100. The display panel 200 may include a bending portion BP extending from the display portion DP-1. The bending part BP may be bent to face a rear surface portion DP-2 of the display panel 200. In this case, the rear surface portion DP-2 may correspond to a surface opposite to the display portion DP-1 provided in the front surface of the display panel 200.

The driving circuit unit 300 may be electrically connected to the display panel 200. The driving circuit unit 300 may be connected to the bending portion BP of the display panel 200. The driving circuit unit 300 may include a main circuit board MB and a flexible film CF. The main circuit board MB may be electrically connected to the flexible film CF. The driving circuit unit 300 may be disposed on the rear surface portion DP-2 of the display panel 200.

The flexible film CF may be electrically connected to the display panel 200. The flexible film CF may be connected to pads of the display panel 200, which are arranged in the bending portion BP. The flexible film CF may provide electrical signals to the display panel 200 to drive the display panel 200. The electrical signals may be generated by the flexible film CF or the main circuit board MB. The main circuit board MB may include various driving circuits used to drive the display panel 200 or a connector used to supply a power. In the present embodiment, a driving chip IC may be disposed on the bending portion BP of the display panel 200. The driving chip IC may include a driving circuit to drive the display panel 200. The driving chip IC may be electrically connected to the driving circuit unit 300. According to an embodiment of the present invention, the driving chip IC may be disposed on the main circuit board MB or the flexible film CF.

According to an embodiment of the present invention, in a case where the bending portion BP of the display panel 200 does not exist, the flexible film CF may be bent to allow the main circuit board MB to be disposed on the rear surface portion DP-2 of the display panel 200.

The housing 400 may be coupled to the window 100. The housing 400 coupled to the window 100 may provide an inner space.

The housing 400 may include a material with a relatively high rigidity. For example, the housing 400 may include a plurality of frames and/or plates containing glass, plastic, metal, or a combination thereof. The housing 400 may stably protect the components of the display device DD, which are accommodated in the inner space, from external impacts.

Referring to FIG. 3, the display device DD may include the protective cap 500 coupled with the display panel 200. The protective cap 500 may protect the display panel 200 and the driving circuit unit 300 from external impacts during a manufacturing process of the display device DD. The protective cap 500 may protect the bending portion BP of the display panel 200 from the outside.

The protective cap 500 may be coupled with the rear surface portion DP-2 of the display panel 200. The protective cap 500 may overlap the driving circuit unit 300 disposed on the rear surface portion DP-2 of the display panel 200. The protective cap 500 may be coupled with the display panel 200 to cover the driving circuit unit 300 in the third direction DR3.

The protective cap 500 may include a base substrate BS, a plurality of blocks 510, and a plurality of cover plates 520. The blocks 510 may include first blocks 511 and second blocks 512.

Figure 4:
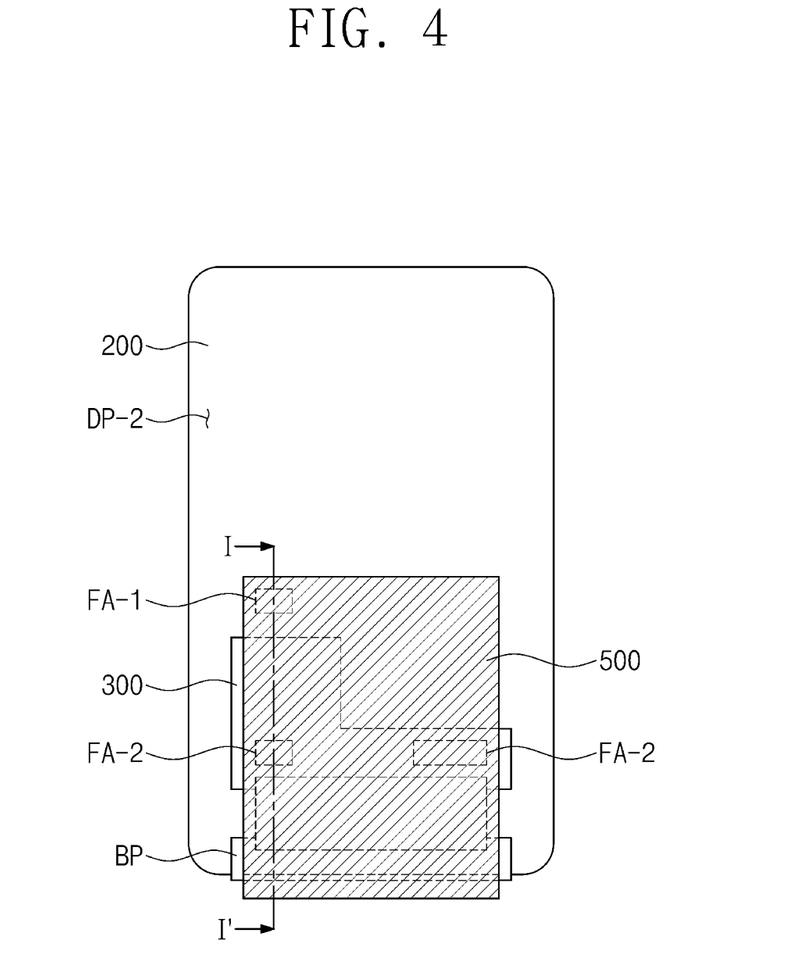
FIG. 4 is a plan view illustrating a display device according to an embodiment of the present invention.
Figure 5:
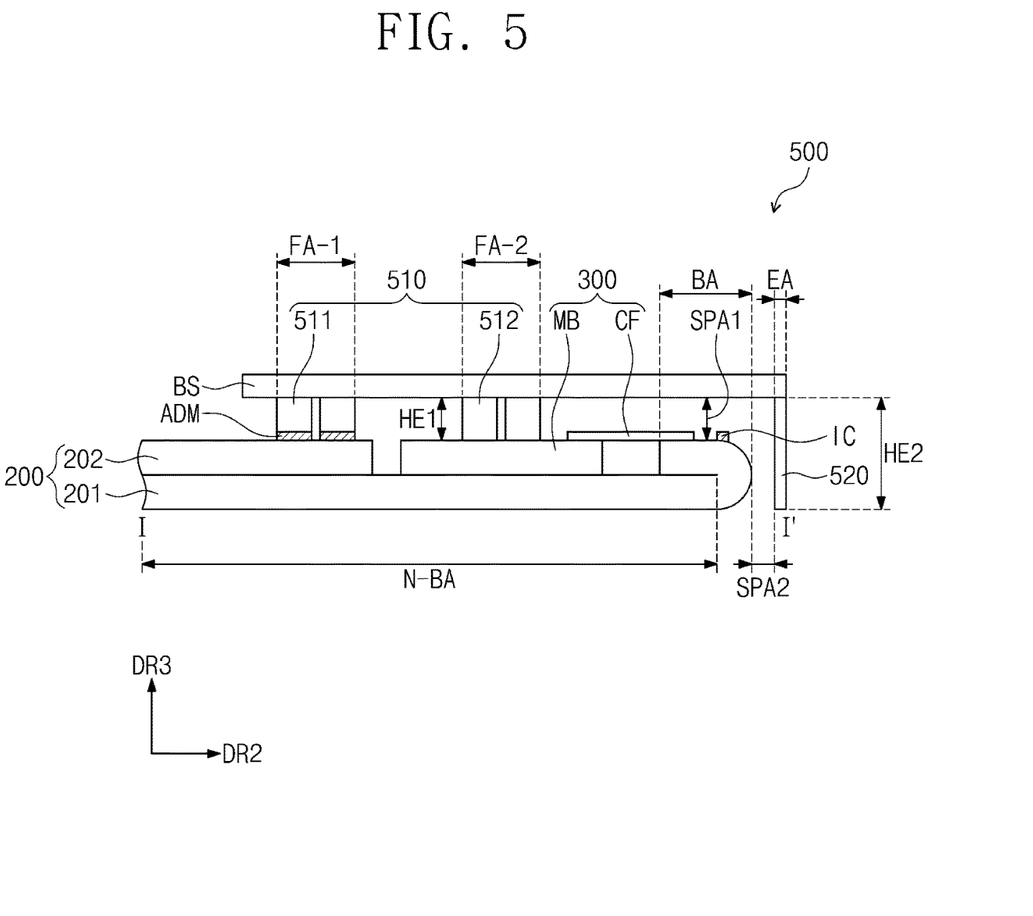
FIG. 5 is a cross-sectional view illustrating a display device according to an embodiment of the present invention.

FIG. 4 is a plan view illustrating the display device according to an embodiment of the present invention, and FIG. 5 is a cross-sectional view illustrating the display device according to an embodiment of the present invention.

Referring to FIG. 4, the protective cap 500 may cover the bending portion BP of the display panel 200 and the driving circuit unit 300. The protective cap 500 may include first areas FA-1 and FA-2 provided in a base surface of the base substrate BS. The base surface may correspond to one surface of the base substrate BS, which faces the rear surface portion DP-2 of the display panel 200. The first areas may include a contact area FA-1 and a support area FA-2. FIG. 5 is a cross-sectional view taken along a line I-I' of FIG. 4. Referring to FIG. 5, the display panel 200 may include a display layer 201 and a functional layer 202. According to an embodiment of the present invention, the display layer 201 may include a light emitting element layer or the like, and the functional layer 202 may include a protective panel or the like. The rear surface portion DP-2 of the display panel 200 may be provided in the functional layer 202.

The protective cap 500 may be attached to the rear surface portion DP-2 of the display panel 200 and may overlap the driving circuit unit 300. The protective cap 500 may include the blocks 510 and cover plates 520. The blocks 510 may be disposed on the base surface BSS of the base substrate BS, and the cover plates 520 may be disposed on an edge area EA of the base surface BSS.

The blocks 510 may be disposed in the first areas FA-1 and FA-2. The blocks 510 may include the first blocks 511 and the second blocks 512. The first blocks 511 may be disposed in the contact area FA-1, and the second blocks 512 may be disposed in the support area FA-2. The first blocks 511 may be disposed on the rear surface portion DP-2. For example, the first blocks 511 may be disposed on the functional layer 202. The second blocks 512 may be disposed on the main circuit board MB of the driving circuit unit 300.

According to an embodiment of the present invention, an adhesive member ADM may be disposed between the first blocks 511 and the display panel 200. For example, the first blocks 511 may be attached to the rear surface portion DP-2 of the display panel 200 by the adhesive member ADM. As an additional example, the second blocks 512 may be in contact with the main circuit board MB. The second blocks 512 may be disposed on the main circuit board MB and may support the main circuit board MB.

The display panel 200 may include a non-bending area N-BA and a bending area BA. The bending area BA may include the bending portion BP. The base substrate BS of the protective cap 500 may cover the non-bending area N-BA and the bending area BA of the display panel 200. The base substrate BS and the cover plates 520 of the protective cap 500 may cover the bending area BA of the display panel 200. The base substrate BS may cover the bending area BA in the third direction DR3, and the cover plates 520 may cover the bending area BA in the second direction DR2.

Each of the first blocks 511 and the second blocks 512 may be provided in plural. In FIG. 5, two first blocks 511 and two second blocks 512 are shown, however, these are merely examples viewed in the cross-section, and the number of the first and second blocks 511 and 512 should not be limited.

For example, the blocks 511 and 512 may have substantially the same size as each other. For example, the blocks 511 and 512 may have substantially the same height as each other, e.g., a height HE1, and may have the same width as each other. For example, the cover plates 520 may have substantially the same size as each other. For example, the cover plates 520 may have substantially the same height as each other, e.g., a height HE2. According to an embodiment of the present invention, the height HE2 of the cover plates 520 may be greater than the height HE1 of the blocks 511 and 512. The height may be a length measured in the third direction DR3. For example, the height HE2 of the cover plates 520 may be greater than the height HE1 of the blocks 511 and 512 by a thickness of the display panel 200. In other words, the height difference between the cover plates 520 and the blocks 511 and 512 may be substantially equal to the thickness of the display panel 200. In this case, the thickness of the display panel 200 may correspond to a length in the third direction DR3 of the display panel 200.

The bending portion BP may be spaced apart from the base substrate BS by a first separation distance SPA1. In addition, the bending portion BP may be spaced apart from the cover plates 520 by a second separation distance SPA2. According to an embodiment of the present invention, the first separation distance SPA1 may be substantially the same as the height HE1 of the blocks 511 and 512. The second separation distance SPA2 is not particularly limited as long as it is enough to protect the bending portion BP from external impacts. For example, the second separation distance SPA2 may be greater than the first separation distance SPA1.

Figure 6:
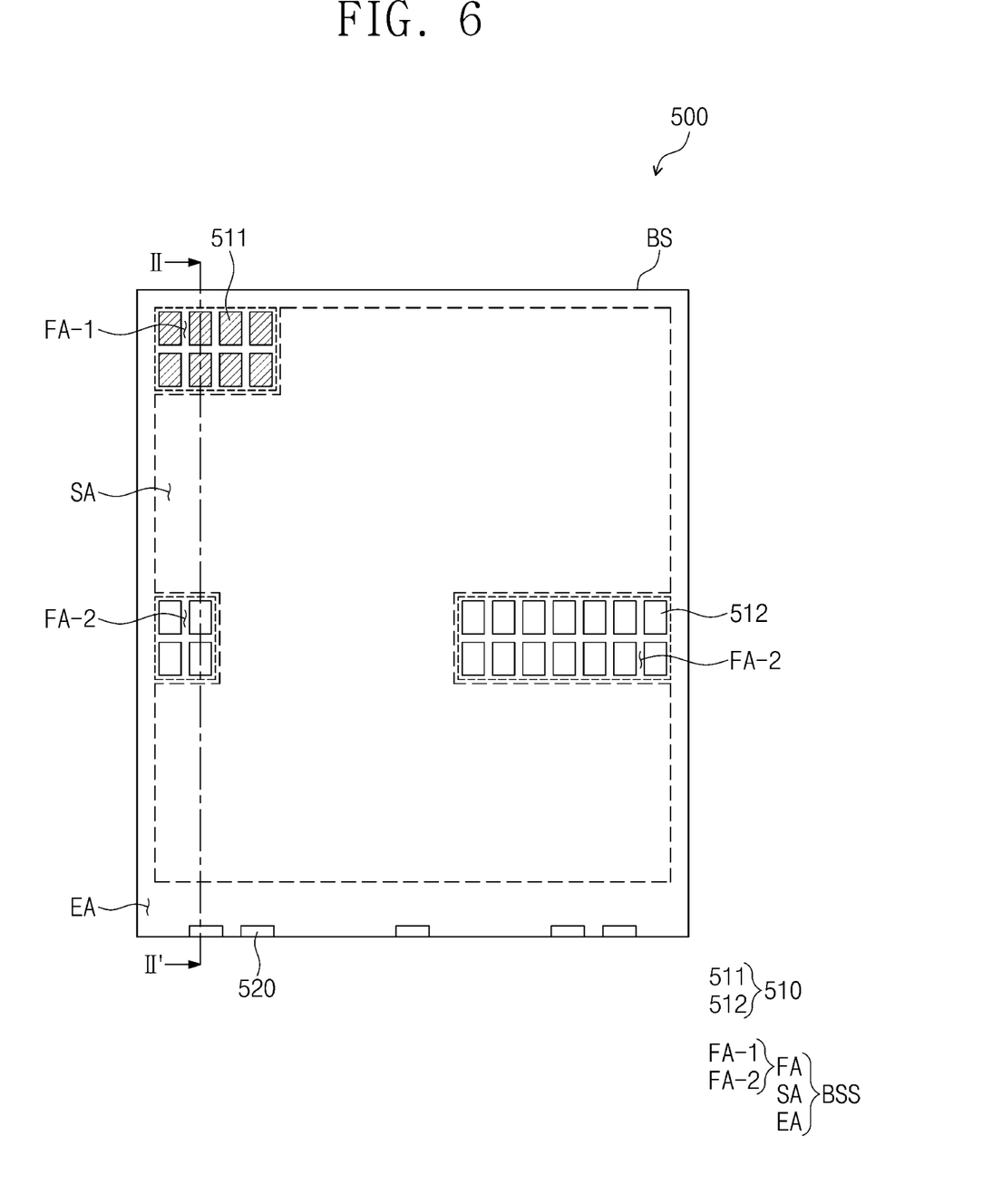
FIG. 6 is a plan view illustrating a protective cap according to an embodiment of the present invention.
Figure 7:
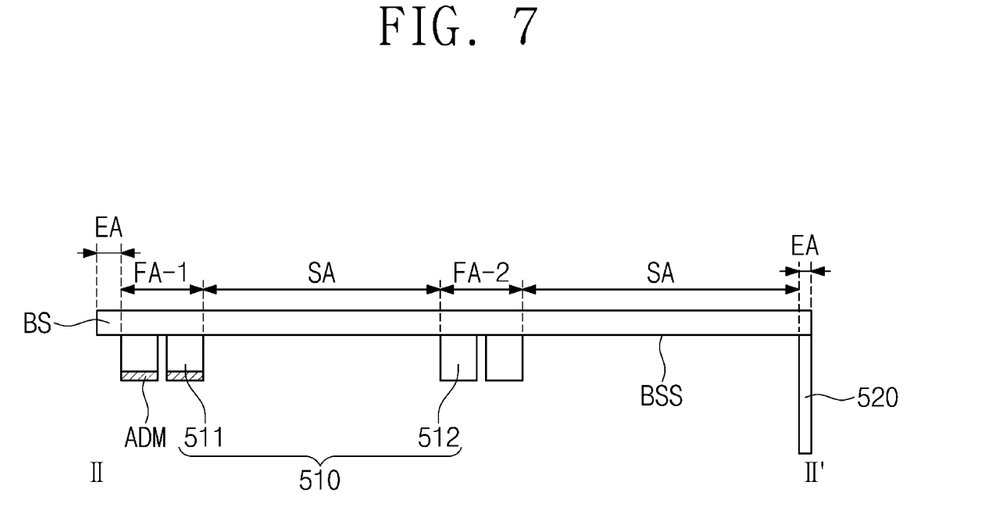
FIG. 7 is a cross-sectional view illustrating a protective cap according to an embodiment of the present invention.

FIG. 6 is a plan view illustrating the protective cap 500 according to an embodiment of the present invention, and FIG. 7 is a cross-sectional view illustrating the protective cap 500 according to an embodiment of the present invention.

FIG. 6 is a plan view illustrating the base surface BSS of the protective cap 500, and FIG. 7 is a cross-sectional view taken along a line II-11' of FIG. 6.

Referring to FIGS. 6 and 7, the base surface BSS of the protective cap 500 may include the first area FA, a second area SA, and the edge area EA. The first area FA may include the contact area FA-1 and the support area FA-2.

The protective cap 500 may include the blocks 510 and the cover plates 520 disposed to protrude on the base surface BSS of the base substrate BS. The blocks 510 may be arranged spaced apart from each other at predetermined intervals. The blocks 510 may include the first blocks 511 and the second blocks 512. The first blocks 511 may be disposed in the contact area FA-1, and the second blocks 512 may be disposed in the support area FA-2.

According to an embodiment, each of the contact area FA-1 and the support area FA-2 may be provided in plural. In FIGS. 6 and 7, one contact area FA-1 and two support areas FA-2 are shown, however, the present invention is not limited thereto or thereby. For example, the first area FA in which the blocks 510 are disposed may be provided in plural. The first areas FA may be arranged spaced apart from each other. For example, the support areas FA-2 may have different widths from each other. The width and the shape of each of the support areas FA-2 may be determined depending on the shape of the display panel 200 and the driving circuit unit 300. For example, the support areas FA-2 may have polygonal shapes. The support areas FA-2 may include different numbers of blocks 510 from each other. Although not shown in figures, the contact areas FA-1 may include different numbers of blocks 510, disposed therein, from each other. The width of the support areas FA-2 may be in proportion to the number of blocks 510.

The second area SA may be adjacent to the first area FA. The second area SA may correspond to an area except the first area FA and the edge area EA in the base surface BSS of the base substrate BS. The second area SA may correspond to an area in which the blocks are not disposed. The second area SA of the base surface BSS may be spaced apart from the rear surface portion DP-2 of the display panel 200 and/or the driving circuit unit 300 in the thickness direction.

The edge area EA may be disposed at an outer portion than the first area FA and the second area SA in the base surface BSS. For example, the edge area EA may exist in one side of the base surface BSS. However, the present invention is not limited thereto. For example, there may be a plurality of edge areas EA.

The cover plates 520 may be disposed in the edge area EA. The cover plates 520 may be arranged in one direction. The cover plates 520 may be disposed spaced apart from each other.

Figure 8A:
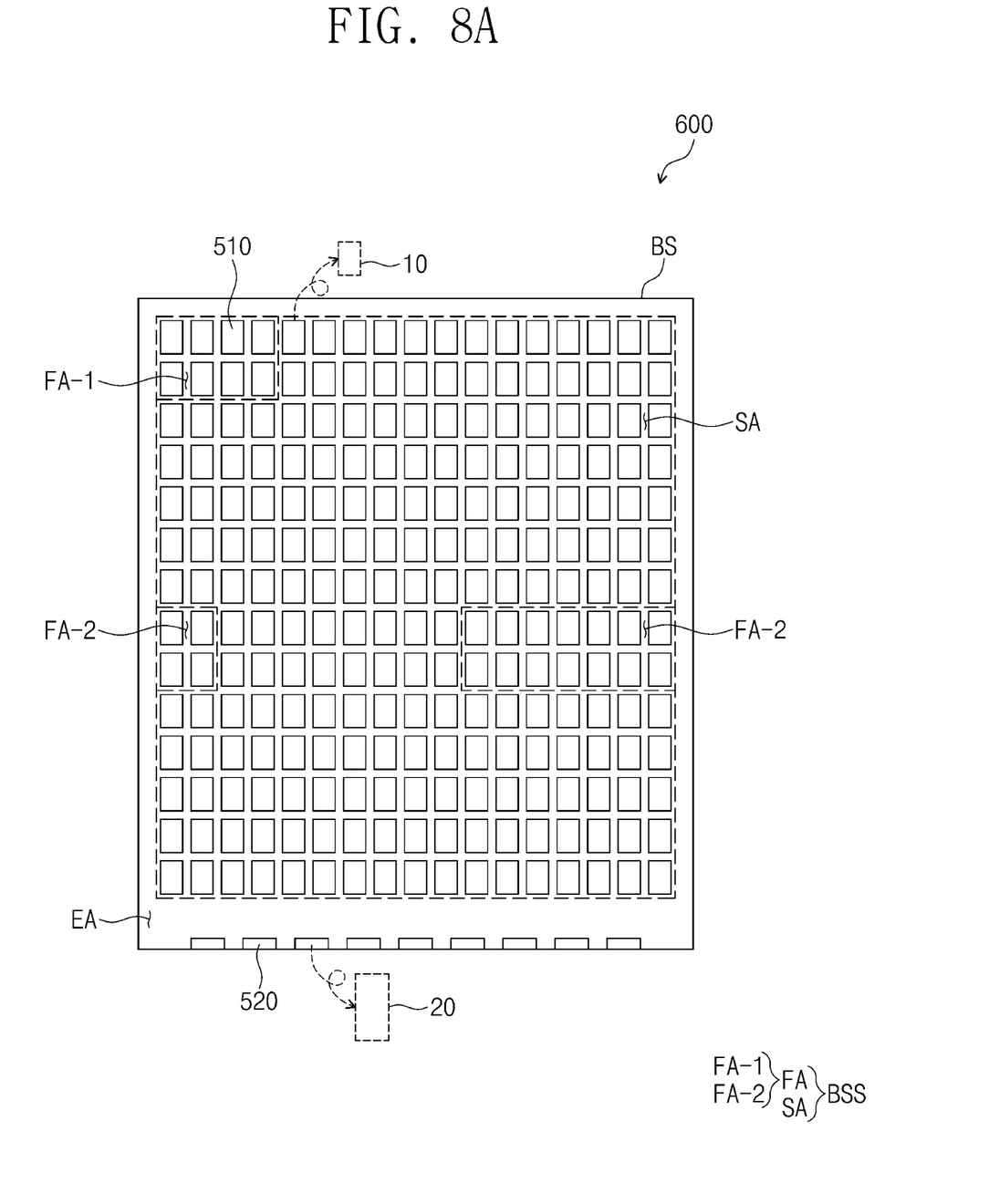
FIGS. 8A and 8B are views respectively illustrating a preliminary protective cap and a protective cap according to an embodiment of the present invention.
Figure 8B:
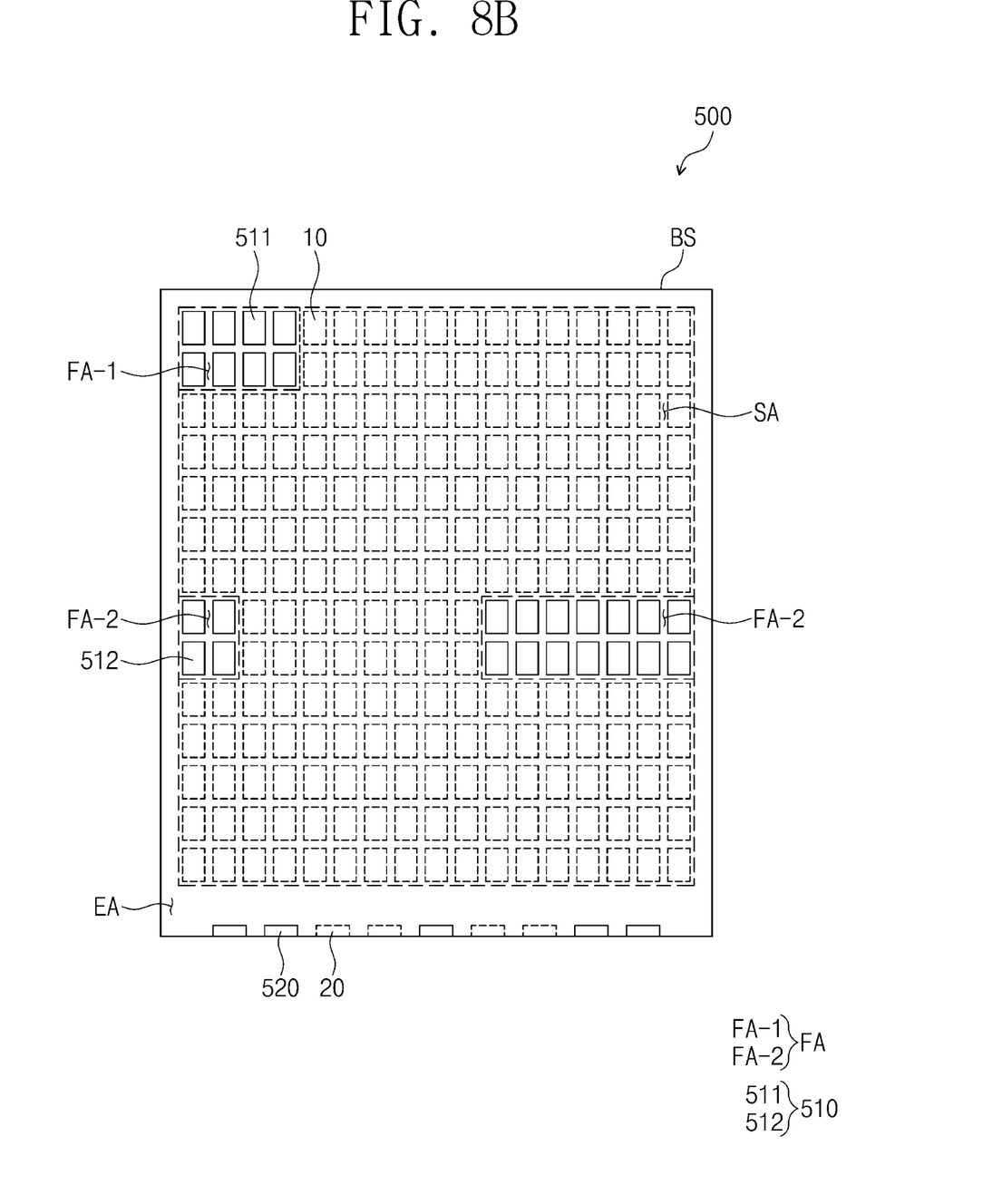

FIGS. 8A and 8B are views illustrating protective caps according to an embodiment of the present invention.

FIG. 8A is a view showing a preliminary protective cap 600 according to an embodiment of the present invention. FIG. 8B is a view illustrating the protective cap 500 manufactured from the preliminary protective cap 600 of the FIG. 8A.

When blocks 10 disposed in a second area SA of the preliminary protective cap 600 shown in FIG. 8A are removed, the protective cap 500 of the present invention may be formed. For example, the blocks 10 of the present invention may be attachable and detachable. For example, the blocks 10 may be attachable and detachable by use of an adhesive or a clipping mechanism. However, the present invention is not limited thereto.

Referring to FIG. 8A, the preliminary protective cap 600 may include a plurality of blocks 510 disposed in a first area FA and the second area SA. According to an embodiment of the present invention, the blocks 510 may be attachable and detachable. In FIG. 8A, among the blocks 10 and 510 of the preliminary protective cap 600, blocks 510 disposed in the first area FA may be attached to a base surface BSS during a process of forming the protective cap 500, and the blocks 10 disposed in the second area SA of the preliminary protective cap 600 may be detached from the base surface BSS during the process of forming the protective cap 500.

FIGS. 8A and 8B show the protective cap 500 shown in FIG. 6 according to an embodiment of the present invention, which is formed from the preliminary protective cap 600.

However, the protective cap 500 of the present invention is not limited to the shape of FIG. 6. For example, positions of the first area FA and the second area SA of the preliminary protective cap 600 and of the protective cap 500 is not limited to those of FIGS. 8A and 8B.

The position of the second area SA may be determined by the position of the blocks 10 that are detached, and the position of the first area FA may be determined by the position of the blocks 510 that are attached. For example, the protective cap 500 according to the present embodiment may include the attachable and detachable blocks, and thus, the protective cap 500 may be provided in various shapes.

The preliminary protective cap 600 may include a plurality of cover plates 520 disposed in an edge area EA. Some cover plates 20 among the cover plates 20 and 520 of the preliminary protective cap 600 may be detached from the edge area EA of the preliminary protective cap 600. When some cover plates 20 are detached, the other cover plates 520 may form the protective cap 500 of the present invention. The detached cover plates 20 should not be limited to those of FIGS. 8A and 8B and may be determined according to the shape of the display panel 200. The cover plates 520 may be disposed to be spaced apart from each other at predetermined intervals and may expose portions of the bending portion BP of the display panel 200 to be visible. According to an embodiment of the present invention, the cover plates 20 may not be detached.

In an embodiment of the present invention, the cover plates 20 may be attachable and detachable by use of an adhesive or a clipping mechanism. However, the present invention is not limited thereto.

According to an embodiment of the present invention, a protective cap that is easy to manufacture in various shapes may be provided.

Accordingly, the present invention provides a display device including the protective cap.

While the present invention has been described with reference to embodiments thereof, it will be understood by those of ordinary skill in the art that various changes in form and details may be made thereto without departing from the spirit and scope of the present invention.

What is claimed is:

1. A protective cap comprising:
a base substrate including a base surface;
a plurality of blocks disposed on the base surface; and
a plurality of cover plates disposed at an edge of the base surface, wherein the base surface comprises a first area and a second area, wherein the plurality of blocks are disposed in the first area and are not disposed in the second area,
wherein the plurality of blocks includes a plurality of first blocks and a plurality of second blocks, wherein the plurality of first blocks contact an adhesive member, and the plurality of second blocks do not contact the adhesive member, wherein the adhesive member contacts a display panel including a display layer and a functional layer that is disposed on the display layer, wherein the adhesive member contacts a first surface of the functional layer, and the display layer contacts a second surface of the functional layer, wherein the second surface of the functional layer is opposite to the first surface of the functional layer,
wherein the plurality of second blocks includes a first plurality of second blocks and a second plurality of second blocks, wherein the plurality of first blocks is arranged with a predetermined interval, wherein the first plurality of second blocks is arranged with the predetermined interval, wherein the second plurality of second blocks is arranged with the predetermined interval, and wherein a number of second blocks included in the first plurality of second blocks is different from a number of second blocks included in the second plurality of second blocks,
wherein a distance between the first plurality of second blocks and the second plurality of second blocks is larger than the predetermined interval.

2. The protective cap of claim 1, wherein the plurality of blocks are configured to attach to and to detach from the base surface, wherein the plurality of blocks are attached to the first area, and are not attached to the second area.

3. The protective cap of claim 1, wherein the first area is provided in plural, and the plurality of blocks disposed in a first-first area among the first areas comprise the adhesive member.

4. The protective cap of claim 1, wherein the edge of the base surface is provided in plural, and the cover plates are disposed at a first edge of the edges and are arranged in one direction.

5. The protective cap of claim 1, wherein the plurality of cover plates are configured to attach and to detach from the base surface.

6. The protective cap of claim 1, wherein each of the plurality of cover plates has a height greater than a height of each of the plurality of blocks, and the height is in a thickness direction of the base substrate.

7. The protective cap of claim 1, wherein the plurality of blocks have substantially a same size as each other.

8. The protective cap of claim 1, wherein the first area is provided in plural, and each of the first areas comprises a different number of blocks from each other.

9. A display device comprising:
a display panel including a display layer and a functional layer that is disposed on the display layer;
a driving circuit unit connected to the display panel; and
a protective cap attached to the display panel and covering the driving circuit unit,
wherein the protective cap comprises:
a base substrate including a base surface including a first area and a second area, wherein the first area overlaps the driving circuit unit, and the second area is adjacent to the first area;
a plurality of blocks protruding from the base surface, wherein the plurality of blocks includes a plurality of first blocks and a plurality of second blocks, wherein the plurality of first blocks contact an adhesive member, and the plurality of second blocks do not contact the adhesive member; and
a plurality of cover plates attached to an edge of the base surface, wherein the plurality of blocks are disposed in the first area and are not disposed in the second area,
wherein the adhesive member is disposed directly between the plurality of first blocks and the display panel, and contacts the display panel and the plurality of first blocks,
wherein the plurality of second blocks includes a first plurality of second blocks and a second plurality of second blocks,
wherein a distance between the first plurality of second blocks and the second plurality of second blocks is larger than a predetermined interval,
wherein the adhesive member contacts a first surface of the functional layer, and the display layer contacts a second surface of the functional layer, wherein the second surface of the functional layer is opposite to the first surface of the functional layer.

10. The display device of claim 9, wherein the plurality of blocks are configured to attach to and detach from the base surface, wherein the plurality of blocks are attached to the first area, and are not attached to the second area.

11. The display device of claim 9, wherein the first area comprises a contact area and a support area, wherein the contact area overlaps the display panel, wherein the support area overlaps the driving circuit unit, and wherein the adhesive member is disposed between the plurality of blocks, which are disposed in the contact area, and the display panel.

12. The display device of claim 11, wherein the support area is provided in plural, and the support areas have different widths from each other and comprise different numbers of blocks from each other.

13. The display device of claim 9, wherein the plurality of cover plates are configured to attach to and detach from the base surface.

14. The display device of claim 9, wherein the display panel comprises:
a display portion displaying an image on an upper surface thereof; and
a bending portion extending from the display portion and bent to face a rear surface of the display panel, and wherein the driving circuit unit is connected to the bending portion and is disposed on the rear surface of the display panel.

15. The display device of claim 14, wherein the base substrate of the protective cap covers the driving circuit unit, and the plurality of cover plates cover the bending portion.

16. The display device of claim 9, wherein the plurality of blocks have substantially a same size as each other.

17. The display device of claim 9, wherein each of the plurality blocks has a height smaller than a height of each of the plurality of cover plates, and the height is in a thickness direction of the base substrate.

18. The display device of claim 9, wherein the second area of the base surface is spaced apart from the driving circuit unit by a height of the plurality of blocks in a thickness direction of the base substrate.

19. The display device of claim 9, wherein the base substrate of the protective cap entirely covers the driving circuit unit in a thickness direction.

* * * * *